UNITED STATES PATENT OFFICE.

WILLIAM J. MOELLER, OF WYOMING, OHIO, ASSIGNOR TO THE PHILIP CAREY MANUFACTURING COMPANY, OF LOCKLAND, OHIO, A CORPORATION OF OHIO.

TILE ROOFING-CEMENT AND PROCESS OF MAKING THE SAME.

1,045,585.   Specification of Letters Patent.   Patented Nov. 26, 1912.

No Drawing.   Application filed July 5, 1912.   Serial No. 707,775.

*To all whom it may concern:*

Be it known that I, WILLIAM J. MOELLER, a citizen of the United States, residing at Wyoming, in the county of Hamilton and State of Ohio, have invented a new and useful Improvement in Tile Roofing-Cement and Process of Making the Same, of which the following is a specification.

My invention relates to a composition of matter comprising tile roofing cement, and to the process of making the same.

The object of my invention is to make a perfect bond or joint to which the surrounding or adjacent tile will adhere, to produce a tile roofing cement which will withstand the action of the elements, which will not run or spread in summer or crack in winter and which will make the joints between the tiling perfectly water tight, and a cement which will contract and expand with the contraction and expansion of the tiling between which it is placed and into which said tiling is embedded.

My invention consists in a mixture of approximately seventy-five per cent. by weight of asbestos-sand and approximately twenty-five per cent. by weight of coal-tar-pitch thoroughly commingled and combined.

In preparing my invention I put the asbestos-sand and coal-tar-pitch in substantially the proportions stated into a steam jacketed tank which has an agitator therein whereby said ingredients are thoroughly mixed and commingled together. To the steam jacket of said tank I apply steam at from approximately one hundred pounds pressure to one hundred and twenty-five pounds pressure, thus subjecting the ingredients while being mixed and commingled to a temperature ranging from about three hundred degrees Fahrenheit to about three hundred and fifty degrees Fahrenheit and thereby enabling me to get the coal-tar-pitch and asbestos-sand thoroughly commingled and combined and giving the composition a uniform consistency and homogenity throughout as well as giving it a uniform and greater strength throughout,—and this is a very important and valuable feature. After being thus thoroughly mixed and commingled the composition is drawn off into barrels ready for use. The mixture when drawn off is soft and pliable but will become solid after standing in the barrels. Preparatory to using the same it should be again heated to make it soft and pliable so that it can be easily and conveniently handled and applied. After being applied it will become hard and possesses the qualities and advantages herein stated. The composition thus produced forms a solid, strong, durable, water-resisting and fire-resisting bed and a joint for block, slab or other tile. It possesses the qualities also of adhering firmly and tenaciously to said tiling and of contracting and expanding sufficiently to prevent any unevenness, breaking or cracking of the same at the joints which it forms between the tiling, due to any change in temperature.

In ground asbestos sand for my tile roofing cement which I call "Metaxite", fifteen per cent., more or less, of the ground product consists of fine asbestos fiber which produces a very much better binder and gives much greater tensile strength and efficiency than ordinary sand which contains no fiber but is very granular with uniform grains. White ground asbestos sand contains numerous sized particles, making a more perfect mixture with fewer voids. Asbestos sand contains silica, aluminum, iron and magnesia, while ordinary glass sand is all silica. Asbestos sand is absolutely clean from foreign matter while it is difficult to obtain this result from ordinary sand. Therefore the results obtained by my invention are far superior to others.

While the proportions above given produce highly efficient results, and the same are entirely satisfactory in the production of a first class composition for this purpose, I desire it to be understood that some variation in these proportions will likewise produce good results and that the same are included within the scope and spirit of my invention.

I claim:

1. A composition of matter for tile roofing cement consisting of asbestos-sand and coal-tar-pitch commingled and combined, substantially as described.

2. A composition of matter for tile roofing cement consisting of approximately seventy-five per cent. of asbestos-sand and approximately twenty-five per cent. of coal-tar-pitch, substantially as described.

3. The process of producing a composition of matter forming a tile roofing cement which consists in thoroughly mixing and commingling asbestos-sand and coal-tar-pitch while being subjected to heat, substantially as described.

4. The process of producing a composition of matter forming a tile roofing cement which consists in thoroughly mixing and commingling asbestos-sand and coal-tar-pitch in the proportions stated while being subjected to heat, substantially as described.

5. The process of producing a composition of matter forming a tile roofing cement which consists in thoroughly mixing and commingling asbestos-sand and coal-tar-pitch in substantially the proportions of seventy-five per cent. of asbestos-sand and twenty-five per cent. of coal-tar-pitch while being subjected to heat of from three hundred degrees Fahrenheit to three hundred and fifty degrees Fahrenheit, substantially as set forth and for the purposes specified.

WILLIAM J. MOELLER.

Witnesses:
JAMES N. RAMSEY,
GOLDIE GORDON.